US009320984B2

(12) United States Patent
Govindan et al.

(10) Patent No.: US 9,320,984 B2
(45) Date of Patent: Apr. 26, 2016

(54) HUMIDIFICATION-DEHUMIDIFICATION SYSTEM WITH A BUBBLE-COLUMN VAPOR MIXTURE CONDENSER AND INTERMEDIATE GAS EXTRACTION

(71) Applicants: Massachusetts Institute of Technology, Cambridge, MA (US); King Fahd University of Petroleum and Minerals, Dhahran (SA)

(72) Inventors: Prakash Narayan Govindan, Melrose, MA (US); Gregory P. Thiel, Belmont, MA (US); Ronan K. McGovern, Cambridge, MA (US); John H. Lienhard, Cambridge, MA (US); Mostafa H. Elsharqawy, Dhahran (SA)

(73) Assignee: Massachusetts Institute of Technology, Cambridge, MA (US)

( * ) Notice: Subject to any disclaimer, the term of this patent is extended or adjusted under 35 U.S.C. 154(b) by 0 days.

(21) Appl. No.: 14/729,377

(22) Filed: Jun. 3, 2015

(65) Prior Publication Data

US 2015/0260418 A1    Sep. 17, 2015

Related U.S. Application Data

(63) Continuation of application No. 13/241,907, filed on Sep. 23, 2011, now Pat. No. 9,072,984.

(51) Int. Cl.
*B01D 3/20* (2006.01)
*B01D 5/00* (2006.01)
(Continued)

(52) U.S. Cl.
CPC .............. *B01D 3/205* (2013.01); *B01D 3/007* (2013.01); *B01D 3/18* (2013.01); *B01D 5/003* (2013.01);
(Continued)

(58) Field of Classification Search
CPC ...... Y02W 10/37; B01D 5/0027; B01D 5/006; B01D 5/0036; B01D 3/18
See application file for complete search history.

(56) References Cited

U.S. PATENT DOCUMENTS

| | | | |
|---|---|---|---|
| 3,243,358 A | | 3/1966 | McCue |
| 3,257,291 A | * | 6/1966 | Heinz ...................... C02F 1/10 |
| | | | 159/13.4 |

(Continued)

FOREIGN PATENT DOCUMENTS

| | | | | |
|---|---|---|---|---|
| CH | 2281896 A1 | * | 3/1976 | ............ B01D 3/346 |
| CN | 101538070 B | * | 9/2011 | |

(Continued)

OTHER PUBLICATIONS

EPO translation of Zheng CN 101538070 published Sep. 23, 2009.*

*Primary Examiner* — Duane Smith
*Assistant Examiner* — Stephen Hobson
(74) *Attorney, Agent, or Firm* — Modern Times Legal; Robert J. Sayre

(57) ABSTRACT

A humidification-dehumidification system comprises a source of liquid; a humidifier including carrier-gas and liquid inlets and outlets and a chamber in which the liquid can contact a carrier gas containing a condensable fluid in vapor phase that is introduced from the carrier-gas inlet in a counterflow arrangement and in which a portion of the liquid can vaporize into the carrier gas; a bubble-column vapor mixture condenser including at least first and second stages, each stage including a carrier-gas inlet and outlet and a chamber configured to contain a liquid bath in fluid communication with the carrier-gas inlet and the carrier-gas outlet; a conduit passing from the source of the liquid through the chamber of each stage of the bubble-column condenser; and an intermediate exchange conduit coupled with (a) the bubble-column vapor mixture condenser and (b) the humidifier chamber at intermediate stages of each for transfer of the carrier gas therebetween.

8 Claims, 3 Drawing Sheets

(51) Int. Cl.
    *B01D 3/18*    (2006.01)
    *B01F 3/04*    (2006.01)
    *F24F 3/14*    (2006.01)
    *B01D 3/00*    (2006.01)

(52) U.S. Cl.
    CPC .............. *B01D 5/006* (2013.01); *B01D 5/0027* (2013.01); *B01D 5/0036* (2013.01); *B01F 3/04106* (2013.01); *B01F 3/04468* (2013.01); *F24F 3/14* (2013.01); *B01F 2215/0091* (2013.01); *Y02W 10/37* (2015.05)

(56) References Cited

U.S. PATENT DOCUMENTS

| | | | |
|---|---|---|---|
| 3,558,436 A * | 1/1971 | Foley et al. .............. | C02F 1/16 202/196 |
| 3,606,999 A * | 9/1971 | Lawless .................... | 423/659 |
| 4,252,546 A | 2/1981 | Krugmann | |
| 4,276,124 A | 6/1981 | Mock | |
| 4,363,703 A | 12/1982 | ElDifrawi et al. | |
| 4,426,322 A * | 1/1984 | Stage .................... | C11B 13/005 159/13.1 |
| 4,595,459 A * | 6/1986 | Kusakawa .............. | B01D 3/346 159/16.1 |
| 4,762,593 A | 8/1988 | Yongner | |
| 5,123,481 A | 6/1992 | Albers et al. | |
| 5,290,403 A | 3/1994 | Saeask | |
| 5,552,022 A * | 9/1996 | Wilson .................... | B01D 3/103 137/142 |
| 5,724,828 A | 3/1998 | Korenic | |
| 6,919,000 B2 | 7/2005 | Klausner et al. | |
| 7,621,991 B2 | 11/2009 | Ruan | |
| 7,938,888 B2 | 5/2011 | Assaf | |
| 8,523,985 B2 | 9/2013 | Govindan et al. | |
| 8,778,065 B2 | 7/2014 | Govindan et al. | |
| 2002/0053505 A1 | 5/2002 | Arrison | |
| 2002/0166758 A1 * | 11/2002 | Vinz .................... | B01D 1/26 203/2 |
| 2004/0026225 A1 | 2/2004 | Domen | |
| 2004/0163536 A1 | 8/2004 | Baudat et al. | |
| 2004/0231970 A1 * | 11/2004 | Lee ...................... | B01D 1/0076 203/10 |
| 2010/0314228 A1 * | 12/2010 | Huang .................... | H01H 13/83 200/314 |
| 2010/0314238 A1 * | 12/2010 | Frolov .................. | B01D 1/0047 203/10 |
| 2011/0056822 A1 * | 3/2011 | Elsharqawy ............ | C02F 1/048 203/11 |
| 2011/0079504 A1 | 4/2011 | Govindan et al. | |
| 2011/0266132 A1 * | 11/2011 | Takezaki .............. | B01D 1/0035 202/233 |
| 2013/0074694 A1 | 3/2013 | Govindan et al. | |

FOREIGN PATENT DOCUMENTS

| | | |
|---|---|---|
| DE | 0 70 594 B | 12/2012 |
| GB | 698 966 A | 10/1953 |

\* cited by examiner

HUMIDIFICATION-DEHUMIDIFICATION SYSTEM WITH A BUBBLE-COLUMN VAPOR MIXTURE CONDENSER AND INTERMEDIATE GAS EXTRACTION

RELATED APPLICATIONS

This application is a continuation of U.S. application Ser. No. 13/241,907, filed 23 Sep. 2011, the entire contents of which are incorporated herein by reference.

BACKGROUND

In this century, the shortage of fresh water will surpass the shortage of energy as a global concern for humanity, and these two challenges are inexorably linked, as explained in the "Special Report on Water" in the 20 May 2010 issue of The Economist. Fresh water is one of the most fundamental needs of humans and other organisms; each human needs to consume a minimum of about two liters per day. The world also faces greater freshwater demands from farming and industrial processes.

The hazards posed by insufficient water supplies are particularly acute. A shortage of fresh water may lead to a variety of crises, including famine, disease, death, forced mass migration, cross-region conflict/war, and collapsed ecosystems. Despite the criticality of the need for fresh water and the profound consequences of shortages, supplies of fresh water are particularly constrained. 97.5% of the water on Earth is salty, and about 70% of the remainder is locked up as ice (mostly in ice caps and glaciers), leaving only a fraction of all water on Earth as available fresh (non-saline) water.

Moreover, the earth's water that is fresh and available is not evenly distributed. For example, heavily populated countries, such as India and China, have many regions that are subject to scarce supplies. Further still, the supply of fresh water is often seasonally inconsistent. Meanwhile, demands for fresh water are tightening across the globe. Reservoirs are drying up; aquifers are falling; rivers are dying; and glaciers and ice caps are retracting. Rising populations increase demand, as do shifts in farming and increased industrialization. Climate change poses even more threats in many regions. Consequently, the number of people facing water shortages is increasing. Naturally occurring fresh water, however, is typically confined to regional drainage basins; and transport of water is expensive and energy-intensive.

On the other hand, many of the existing processes for producing fresh water from seawater (or to a lesser degree, from brackish water) require massive amounts of energy. Reverse osmosis (RO) is currently the leading desalination technology. In large-scale plants, the specific electricity required can be as low as 4 kWh/m$^3$ at 30% recovery, compared to the theoretical minimum of around 1 kWh/m$^3$; smaller-scale RO systems (e.g., aboard ships) are less efficient.

Other existing seawater desalination systems include thermal-energy-based multi-stage flash (MSF) distillation, and multi-effect distillation (MED), both of which are energy- and capital-intensive processes. In MSF and MED systems, however, the maximum brine temperature and the maximum temperature of the heat input are limited in order to avoid calcium sulphate precipitation, which leads to the formation of hard scale on the heat transfer equipment.

Humidification-dehumidification (HDH) desalination systems include a humidifier and a dehumidifier as their main components and use a carrier gas (e.g., air) to communicate energy between the heat source and the brine. In the humidifier, hot seawater comes in direct contact with dry air, and this air becomes heated and humidified. In the dehumidifier, the heated and humidified air is brought into (indirect) contact with cold seawater and gets dehumidified, producing pure water and dehumidified air. Some of the present inventors were also inventors on the following patent applications that include additional discussion relating to HDH processes for purifying water: U.S. application Ser. No. 12/554,726, filed 4 Sep. 2009; U.S. application Ser. No. 12/573,221, filed 5 Oct. 2009; and U.S. application Ser. No. 13/028,170, filed 15 Feb. 2011.

An approach from the University of Florida, which is described in U.S. Pat. No. 6,919,000 B2, reduced the thermal resistance associated with incondensable gases by using a direct-contact condenser instead of a standard, indirect contact dehumidifier. This method increases the heat transfer rates in the condenser at the expense of energy efficiency, as the energy from the humid air entering the dehumidifier is not directly recovered to preheat the seawater. Thus, although the cost of the dehumidification device is reduced, energy costs increase.

SUMMARY

Single-stage and multi-stage bubble-column vapor mixture condensers (referred to simply as a condenser elsewhere herein) and the operation thereof are described herein.

Various embodiments of the apparatus and methods may include some or all of the elements, features and steps described below.

In the multi-stage bubble-column condenser, a fluid source supplies a carrier-gas stream including a condensable fluid. The multi-stage condenser includes at least a first stage and a second stage, each of which includes an inlet, an outlet and a chamber in fluid communication with the inlet and the outlet. The inlet of the first stage of the bubble-column condenser is coupled with the fluid source, and the outlet of the first stage is in fluid communication with the inlet of the second stage to facilitate flow of the carrier-gas stream from the fluid source through the chamber of the first stage and then through the chamber of the second stage. The condensable fluid in liquid phase fills the chambers of the first stage and the second stage such that the carrier-gas stream passes through in direct contact with the liquid, which is stationary or in counterflow with the carrier-gas stream, when passing from the inlet to the outlet of each stage. The bubble-column condenser can be coupled with a humidifier in a humidification-dehumidification system, wherein an intermediate exchange conduit is provided for transferring the gas between intermediate stages of the bubble-column condenser and the humidifier.

The apparatus and methods can be used to separate pure water from a liquid mixture (including but not limited to seawater, brackish water and waste water) in a cost-efficient manner, which can result in substantially reduced costs compared with previous approaches. Embodiments of the apparatus and methods can offer numerous advantages. First, based on data for bubble columns given in open literature, the heat-transfer coefficient in the multi-stage bubble-column condenser is estimated to be 7 kW/m$^2$·K (i.e., at least one order of magnitude higher than the current state-of-art). This heat-transfer coefficient is comparable to, if not higher than, film condensation of steam. Second, the high energy recovery can be maintained using a novel multi-staging technique. Third, multi-extraction can be employed in the apparatus and methods to further increase heat recovery. Fourth, the overall

Figure 1:
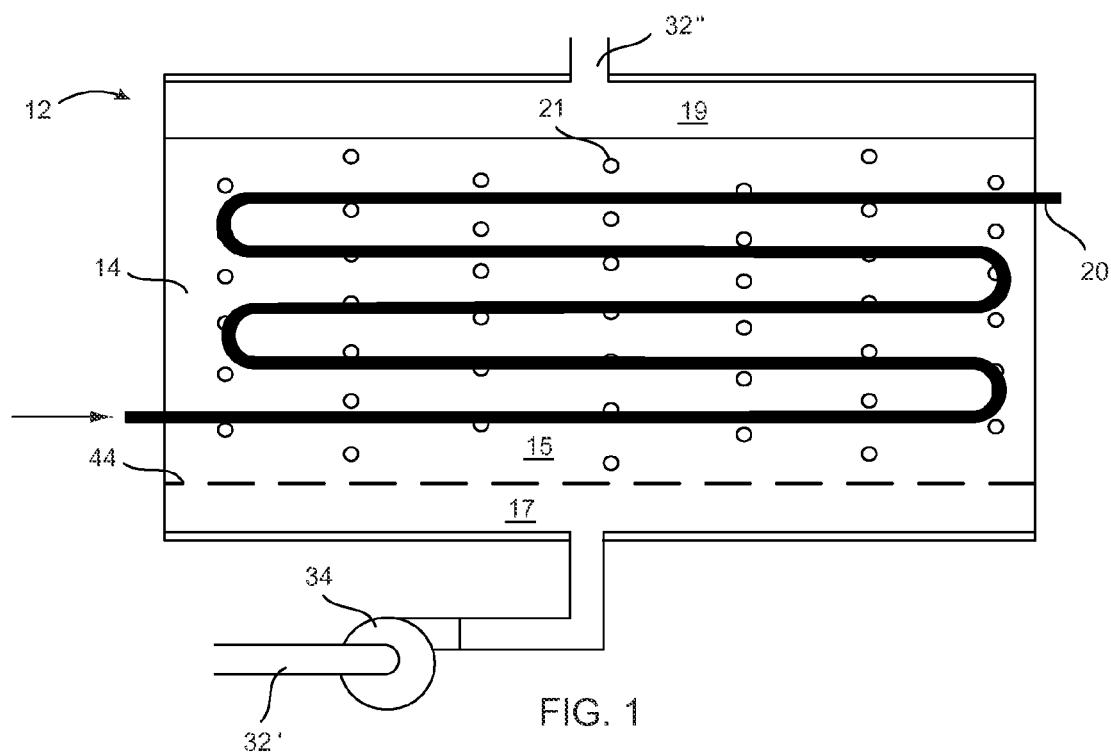
FIG. 1 is a sectional illustration of a single-stage bubble-column condenser.

In the accompanying drawings, like reference characters refer to the same or similar parts throughout the different views; and apostrophes are used to differentiate multiple instances of the same or similar items sharing the same reference numeral. The drawings are not necessarily to scale, with emphasis instead being placed upon illustrating particular principles, discussed below.

DETAILED DESCRIPTION

The foregoing and other features and advantages of various aspects of the invention(s) will be apparent from the following, more-particular description of various concepts and specific embodiments within the broader bounds of the invention(s). Various aspects of the subject matter introduced above and discussed in greater detail below may be implemented in any of numerous ways, as the subject matter is not limited to any particular manner of implementation. Examples of specific implementations and applications are provided primarily for illustrative purposes.

Unless otherwise defined, used or characterized herein, terms that are used herein (including technical and scientific terms) are to be interpreted as having a meaning that is consistent with their accepted meaning in the context of the relevant art and are not to be interpreted in an idealized or overly formal sense unless expressly so defined herein. For example, if a particular composition is referenced, the composition may be substantially, though not perfectly pure, as practical and imperfect realities may apply; e.g., the potential presence of at least trace impurities (e.g., at less than 1 or 2% by weight or volume) can be understood as being within the scope of the description; likewise, if a particular shape is referenced, the shape is intended to include imperfect variations from ideal shapes, e.g., due to machining tolerances.

Although the terms, first, second, third, etc., may be used herein to describe various elements, these elements are not to be limited by these terms. These terms are simply used to distinguish one element from another. Thus, a first element, discussed below, could be termed a second element without departing from the teachings of the exemplary embodiments.

Spatially relative terms, such as "above," "below," "left," "right," "in front," "behind," and the like, may be used herein for ease of description to describe the relationship of one element to another element, as illustrated in the figures. It will be understood that the spatially relative terms, as well as the illustrated configurations, are intended to encompass different orientations of the apparatus in use or operation in addition to the orientations described herein and depicted in the figures. For example, if the apparatus in the figures is turned over, elements described as "below" or "beneath" other elements or features would then be oriented "above" the other elements or features. Thus, the exemplary term, "above," may encompass both an orientation of above and below. The apparatus may be otherwise oriented (e.g., rotated 90 degrees or at other orientations) and the spatially relative descriptors used herein interpreted accordingly.

Further still, in this disclosure, when an element is referred to as being "on," "connected to" or "coupled to" another element, it may be directly on, connected or coupled to the other element or intervening elements may be present unless otherwise specified.

The terminology used herein is for the purpose of describing particular embodiments and is not intended to be limiting of exemplary embodiments. As used herein, singular forms, such as "a" and "an," are intended to include the plural forms as well, unless the context indicates otherwise. Additionally, the terms, "includes," "including," "comprises" and "comprising," specify the presence of the stated elements or steps but do not preclude the presence or addition of one or more other elements or steps.

The presence of incondensable gases can drastically increase the thermal resistance associated with film condensation of steam on a cold surface. For the typical mole fraction (about 70%) of air (incondensable gas) present in a dehumidifier (condenser) of a humidification-dehumidification system, the heat-transfer coefficient can be as low as $\frac{1}{100}$ of that for pure steam condensation (in multi-effect-distillation and multi-stage-flash systems). In absolute value, the heat-transfer coefficient can be as low as 10 W/m$^2$·K. Hence, it is advantageous to reduce the thermal resistance associated with the incondensable gas, while at the same time preserving the advantageous increase in energy efficiency brought about by the methods described in the inventors' previous patent applications, noted in the Background.

A sectional view of an embodiment of a single-stage bubble-column condenser 12 is provided in FIG. 1. The bubble column 14 contains a bath of a liquid 15 (e.g., distilled water in this embodiment). The liquid 15 is supported on a bubble generator 44 inside the bubble-column chamber. Gas chambers 17 and 19 are respectively positioned below and above the liquid. Chamber 17 below the liquid allows a moist carrier gas to be pumped from conduit 32' via a compressor/blower 34 through orifices in the bubble generator 44 into the liquid 15 in the form of bubbles 21, though the lower chamber 17 can be omitted where the bubble generator 44 includes a network of perforated pipes through which the carrier gas is pumped. A tube coil 20 that is coupled with a fluid source (e.g., sea water) snakes through the water 15 in the condenser 12, allowing for heat transfer from the water 15 in the chamber to the sea water being directed through the tube coil 20. Accordingly, cool fluid enters the tube coil 20 at the lower left and exits as heated fluid at the upper right. After passing through the liquid 15, the dry carrier gas collects in the gas chamber 19 at the top of the chamber and is extracted through gas conduit 32".

The bubble generator 44 can have a diameter, e.g., of 1.25 m, and can have a plurality of orifices, each having a diameter, e.g., of 1 mm for generating bubbles of approximately the same diameter. The bubble generator 44 can be in the form of, for example, a sieve plate, wherein the carrier gas is pumped through the orifices in the sieve plate. Alternatively, the bubble generator 44 can be in the form of a sparger with perforated pipes for distributing the carrier gas, wherein the sparger distributes the bubbles through the perforated pipes, which can extend from a central conduit. The perforated pipes in the sparger can feature, e.g., a radial, multiple-concentric-ring, spider-web, or hub-and-spoke wheel-type configuration of the perforated pipes through which the carrier gas is pumped from an external source.

Figure 6:
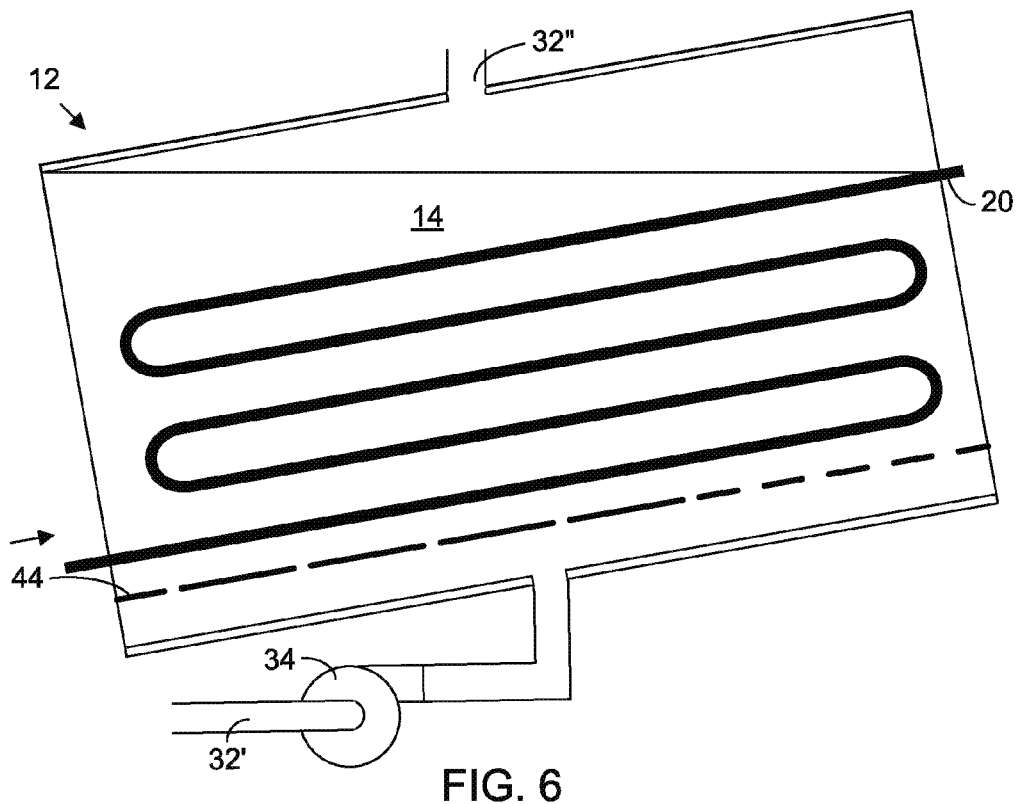
FIG. 6 is a sectional illustration of a bubble-column condenser oriented an angle to the vertical.

As shown in FIG. 6, all components of the bubble column (e.g., all walls and the bubble generator) can be oriented at an angle to the vertical, a, between 0° and 60° with respect to vertical (e.g., with respect to an axis along a radian passing through the center of the earth). As the bubble column 14 is oriented at an angle, the hydrostatic head reduces from $\rho g H$ to $\rho g H \cdot (\cos \alpha)$, where $\rho$ is density (kg/m$^3$), g is gravitational acceleration (9.81 m/s$^2$), and h is the height of the liquid in the column. This reduction in hydrostatic head comes with a reduction in fluid pressure drop of up to 50%. This pressure drop, however, will come with a reduction in the fluid-side heat transfer coefficient at higher angles ($\alpha > 45°$). This is because, at higher angles, the liquid circulation will not be set up in a regular manner. However, for optimized design, the angled configuration with lesser pressure drop may provide significant savings in energy cost.

Figure 2:
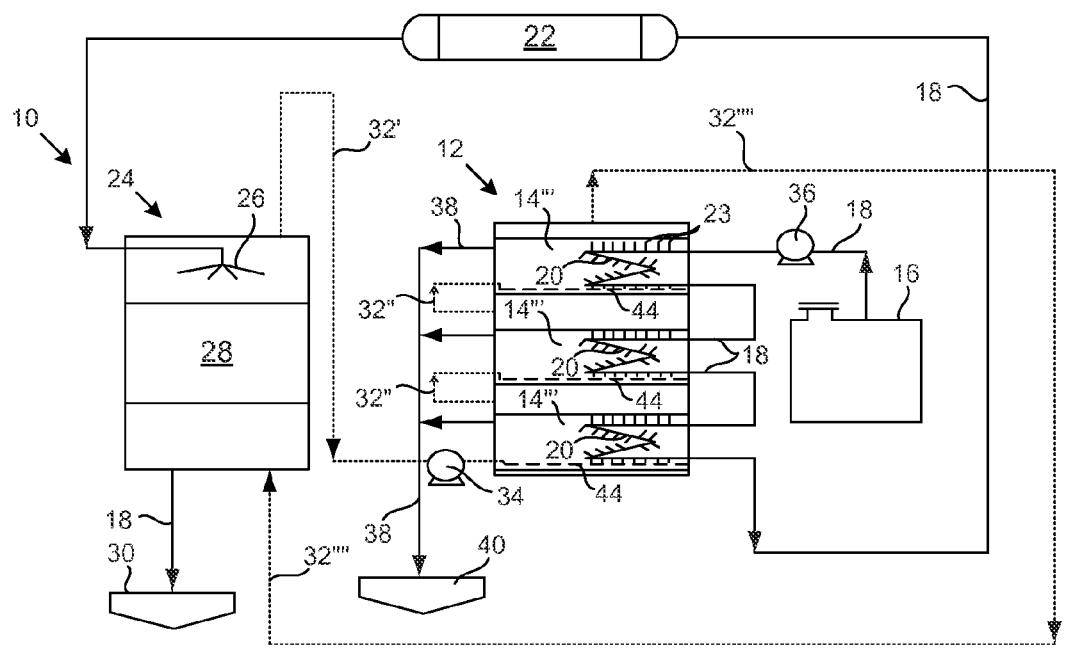
FIG. 2 is a schematic illustration of an embodiment of a humidification-dehumidification water-purification system including a multi-stage bubble-column condenser.

An embodiment of a multi-stage bubble-column condenser in a humidification-dehumidification (HDH) water purifier system 10 is shown in FIG. 2, wherein the dehumidifier is a multi-stage, bubble-column, vapor mixture condenser (also referred to as a "bubbler") 12 instead of using an indirect-contact heat exchanger (as is common with conventional HDH systems) to dehumidify moist carrier gas (e.g., moist air) and produce fresh liquid water efficiently. The carrier gas is humidified with vaporized water from a liquid composition (e.g., sea water or waste water) in the humidifier 24; and the water vapor entrained in the carrier gas is then transported via conduit 32' to the bubble-column condenser 12, where the water in the moist air is condensed to produce fresh (i.e., substantially pure) water.

The liquid composition (e.g., sea water) is provided from a source 16 (e.g., a tank) and circulated through the system by a pump 36, which can mounted in the conduit 18 between the source 16 and the bubble-column condenser 12. The liquid composition is passed through each stage 14 of the condenser 12 via internal conduits 20 mounted in each stage 14, wherein the design of each of the stages 14 can substantially match that of the single-stage bubble column of FIG. 1. In this embodiment, the liquid composition is passed between stages 14 via adjoining external conduits 18 to preheat the liquid composition. The internal conduits 20 can have thermally conductive surfaces (e.g., fins) 23 extending from the conduits 20 (as shown in FIG. 2) to increase the heat transfer from the liquid in the stages 14 to the liquid composition passing through the tube coil 20. After exiting the internal tube coil 20 in the bottom (first) stage 14' of the bubble-column condenser 12, the liquid composition passes through an additional conduit 18 to a heater 22 (e.g., a solar water heater or a waste-heat source) that further heats the liquid composition (e.g., to 80° C.) before the liquid composition is passed into the humidifier 24 and atomized and dispersed via a nozzle 26.

Inside the humidifier, packing material 28 is provided in the form, e.g., of polyvinyl chloride (PVC) packing to facilitate the gas flow and to increase the liquid surface area that is in contact with the carrier gas to increase the portion of the vaporizable liquid that is vaporized into the carrier gas. The body of the humidifier 24 (and the dehumidifier 12 as well as the conduits 18 and 32) can be formed, e.g., of stainless steel and is substantially vapor impermeable. In one embodiment, the humidifier 24 is substantially cylindrical with a height of about 2.5 m and a radius of about 0.5 m.

The humidifier 24 and dehumidifier 12 are both of a modular construction (i.e., each in the form of a separate and discrete device) and are substantially thermally separated from one another. The characterization of the humidifier 24 and dehumidifier 12 as being "substantially thermally separated" is to be understood as being structured for little or no direct conductive thermal energy transfer through the apparatus between the humidifier 24 and the dehumidifier 12, though this characterization does not preclude a mass flow carrying thermal energy (via gas and/or liquid flow) between the chambers. This "substantial thermal separation" characterization thereby distinguishes the apparatus from, e.g., a dew vaporation apparatus, which includes a shared heat-transfer wall between the humidifier and dehumidifier. In the apparatus of this disclosure, the humidifier 24 and dehumidifier 12 need not share any common walls that would facilitate conductive heat transfer there between.

The carrier gas flows upward through the chamber defined by the humidifier 24 from the port for conduit 32''' to the port for conduit 32', where it exits with a higher content of vaporized liquid. Humidification of the carrier gas is achieved by spraying the liquid composition from one or more nozzles 26 at the top of the humidifier 24 down through a zone including packing material 28, where some of the water in the liquid composition will evaporate, while a non-evaporated remnant of the liquid composition (e.g., brine) flows down through a rain zone to the base of the chamber defined by the humidifier 24, where the brine is drained via a conduit 18 into a brine-collection tank 30. Meanwhile, the carrier gas moves up through the humidifier 24 and is brought into contact with the liquid composition, particularly in the bed of packing material 28, to humidify the carrier gas with water vapor evaporated from the liquid composition. The carrier gas can consequently be saturated with water vapor before being withdrawn from the humidifier 24 via conduit 32' and pumped via a compressor/blower 34 through the inlet of a first stage 14' of the multi-stage bubble column condenser 12. In particular embodiments, an air heater and/or an air compressor or thermal vapor compressor can be mounted in conduit 32' to heat and/or compress the carrier gas before it is pumped into the dehumidifier 12. Where an air compressor or thermal vapor compressor is mounted in conduit 32', a complimentary air expander can be mounted in conduit 32'''' to expand the carrier gas, as it is circulated back to the humidifier 24. In other embodiments, the compressor/blower 34 can be positioned in the conduit 32'''' leading to the humidifier 24 because of operational considerations.

The flow of seawater through the tube coil 20 inside the dehumidifier 12 can ensure that the heat is directly recovered to preheat the liquid composition (e.g., sea water in this embodiment) during the condensation process. The bubble-column condenser 12 includes a plurality of stages 14, each filled with a bath of liquid (e.g., distilled water) through which moist, hot carrier gas is passed using a compressor/blower 34 and a bubble generator 44 that injects gas bubbles (or through which bubbles are injected) into the bath.

The hot water-vapor-laden carrier gas emitted from the humidifier (evaporator) 24 passes (e.g., at a temperature of 70° C.) through the conduit 32' extending from the top of the humidifier 24 and is bubbled through each of the stages 14 in the dehumidifier 12, where the carrier gas is cooled and dehumidified. The carrier gas collects at the top of each stage 14 and is passed from an outlet atop each stage 14 via a conduit 32 into and through an inlet of the next stage 14 and through the bubble generator 44, which generates bubbles of the carrier gas that then pass through the distilled water in the stage 14, and the carrier gas is then again collected at the top of the column. This process is sequentially repeated in each subsequent column.

A low pressure drop in the present dehumidifier 12 can keep pumping power low, thereby enabling an economically feasible system. This focus on maintaining low pumping power is in contrast to many bubble columns in the chemical industry, where the primary concern is heat and mass transfer, and where pressure drop may not be a significant design constraint. Pressure drop in the bubble chamber in each stage 14 occurs largely due to the following three factors: (1) head loss at the bubble generator 44, where bubbles are generated, (2) friction between the carrier gas and the distilled water as the bubbles rise through the liquid, and (3) the hydrostatic head. As the hydrostatic head is the largest contributor to total pressure drop across a given stage 14, the height of each stage 14 (measured vertically in the orientation shown in the Figures) is advantageously kept low. To obtain a pressure drop lower than 1 kPa, for example, the total height of all the stages 14 sum to less than about 1 m. Typically, this height constraint manifests itself in the form of a low-aspect-ratio bubble column, where the ratio of column height to diameter (measured horizontally in the orientation shown) is less than 1. In particular embodiments, the diameter of the column is 0.5 to 1 m, while the height of the column is 0.0.5 to 0.1 m (for an aspect ratio of the column is about 0.1).

The temperature of the carrier gas can drop at least 5° C. from each stage to 14 the next in the humidifier 12, as it is cooled by the liquid bath in each stage 14. For example, in the conduit 32" from the outlet of the first stage 14' to the inlet second stage 14", the carrier gas can have a temperature, e.g., of about 60° C., while the carrier gas in the conduit 32''' from the outlet of the second stage 14" to the inlet of the third stage 14''' can have a reduced temperature, e.g., of about 50° C. When the carrier gas exits the bubble-column condenser 12 through the top conduit 32'''', the carrier gas circles back to the bottom of the humidifier 24 (with a reduced content of the vaporizable liquid), its temperature can be further reduced to, e.g., about 30° C. In the initial transient period during process startup, water vapor in the hot-humid carrier gas transmits the latent heat to the water in each stage 14 (in which a natural circulation loop is established); and a mixed average temperature of the water stage 14 is eventually achieved at steady state. Once steady state is achieved, the heat of condensation is directly extracted by seawater that is sent through the coiled tube 20. Thus, direct heat recovery is achieved.

Where the condensed vapor is water, the dehumidification of the carrier gas in each stage 14 releases water from the carrier gas to the distilled water through which carrier gas is bubbled. The water is drained from each stage 14 (equivalent to the water increase provided by the dehumidification of the carrier gas) through conduits 38 to a pure-water collection tank 40. Alternatively, the liquid (e.g., water) can be extracted via a conduit from the bath in the third stage 14''' and passed to the lower-temperature second stage 14" and extracted via another conduit from the second-stage 14" and passed to the still-lower-temperature first stage 14', from which it is finally extracted from the multi-stage, bubble-column condenser 12 as product.

Figure 3:
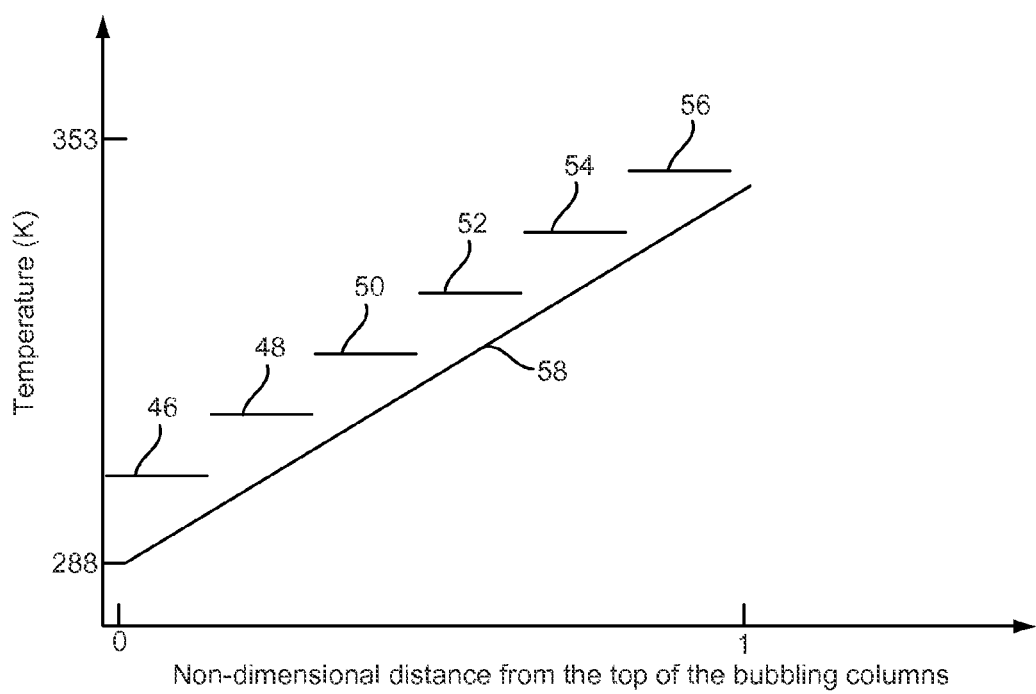
FIG. 3 plots the temperature profile across columns in a multi-stage bubble-column condenser from the top of the bubbling columns.
Figure 4:
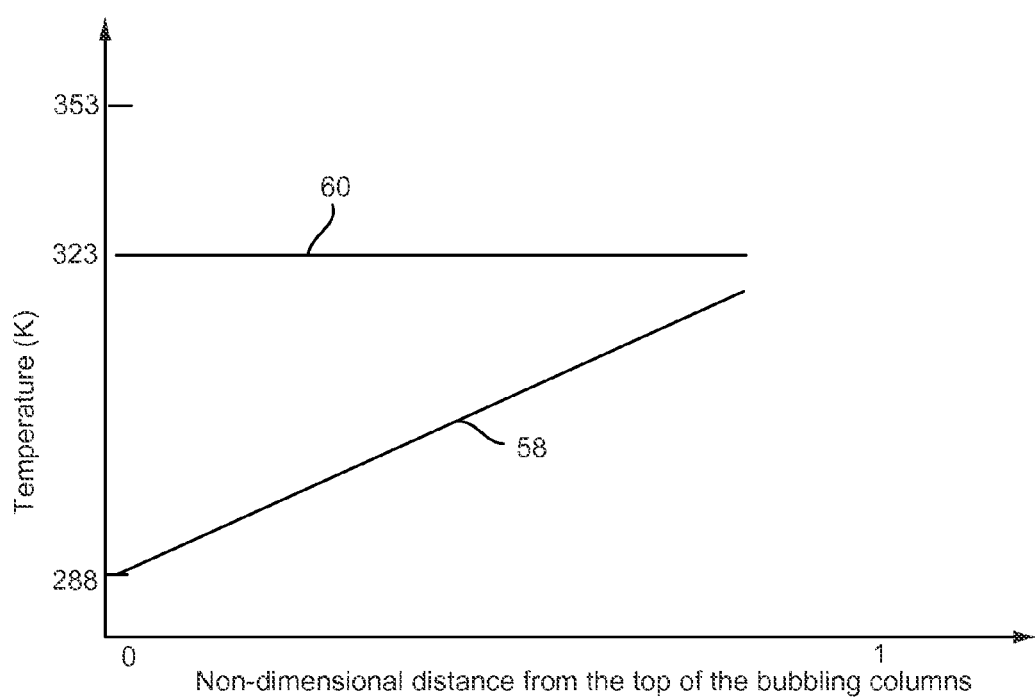
FIG. 4 plots the temperature profile in a single-stage bubble-column condenser from the top of the bubbling column.

Though a single stage/column 14 can be used, the use of multiple stages in the bubble-column condenser 12 pushes the temperature to which the seawater is preheated toward the maximum possible (which is the temperature of the carrier gas inlet). The effects of this staging can be clearly understood via the temperature profiles in a multi-stage bubble-column condenser (shown in FIG. 3) and in a single-stage bubble-column condenser (shown in FIG. 4), where the seawater exit temperature can be seen to be much higher in the plots for the multi-stage bubble-column condenser, as shown in FIG. 3. Each of the plotted horizontal segments 46 (~308 K), 48 (~318 K), 50 (~327 K), 52 (~335 K), 54 (~342 K), 56 (~348 K) in FIG. 3 represents the temperature in a respective column/stage 14 in a six-stage bubble-column condenser, where the horizontal axis of the chart represents non-dimensional distance from the top to the bottom of the bubble-column condenser 12 (i.e., reference line 46 represents the temperature of the top-most stage 14). The diagonal line 58 represents the temperature of the seawater as it flows through the bubble-column condenser 12 as a function of distance from the top of the bubble-column condenser 12. Meanwhile, the temperature 60 in the single-stage, bubble-column condenser (shown in FIG. 4) is seen to be substantially constant (at 323 K) throughout the bubble-column condenser and approximately equal to the average of the inlet and the outlet carrier gas temperatures.

Figure 5:
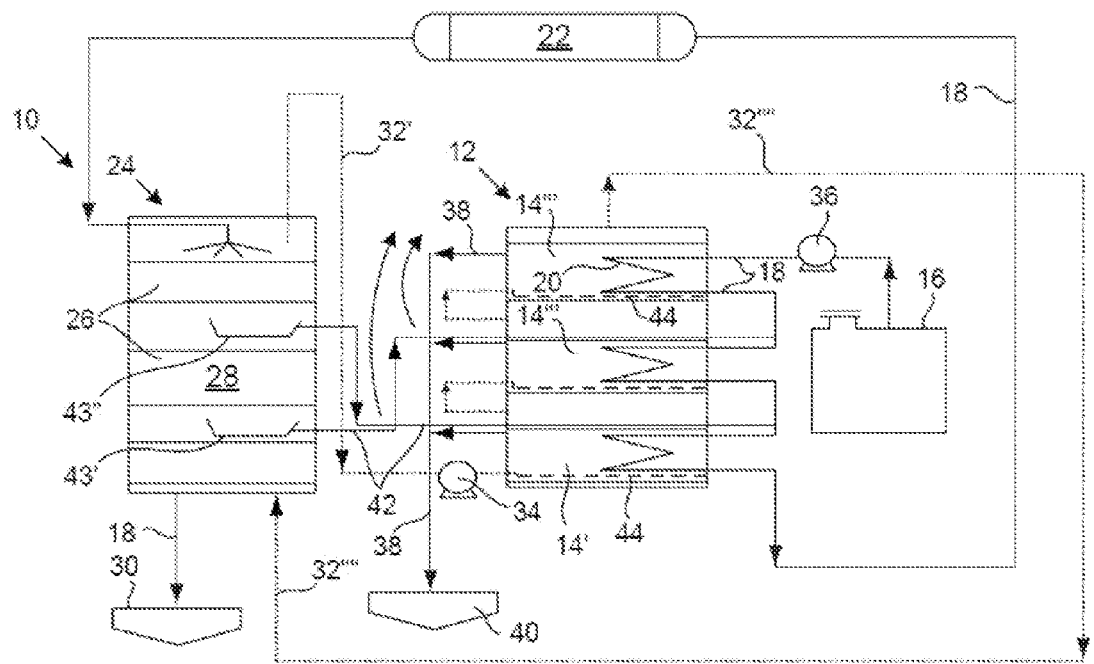
FIG. 5 is a schematic illustration of an embodiment of a multi-extraction humidification-dehumidification water-purification system including a multi-stage bubble-column condenser.

The multi-stage bubble-column condenser 12, additionally, presents a direct advantage of enabling extraction/injections of seawater from in-between the bubble-column stages via intermediate exchange conduits 42, as shown in FIG. 5, where the intermediate exchange conduits 42 are coupled with the bubble-column condenser 12 between the first and second stages 14' and 14" and between the second and third stages 14" and 14''' of a three-stage bubble-column condenser system. Saline water is collected in intermediate trays 43' and 43" at respective intermediate stages in the chamber of the humidifier 24 and injected into the external conduits 18 through which the sea water flows between stages 14' and 14" and between stages 14" and 14''', respectively. In other embodiments, the direction of injection/extraction can be reversed (e.g., saline water can be extracted from the condenser 12 and injected into the humidifier 24), depending on the conditions of operation. Such extraction flows can enable construction of systems that are thermodynamically balanced. In additional embodiments, the moist carrier gas can be extracted/injected instead of extracting/injecting saline water. Owing to the higher heat-transfer coefficients in a bubble-column condenser and a lower terminal temperature difference, the apparatus described herein (such as the one shown in FIG. 5) can provide superior performance in terms of dehumidification and the efficiency thereof.

In describing embodiments of the invention, specific terminology is used for the sake of clarity. For the purpose of description, specific terms are intended to at least include technical and functional equivalents that operate in a similar manner to accomplish a similar result. Additionally, in some instances where a particular embodiment of the invention includes a plurality of system elements or method steps, those elements or steps may be replaced with a single element or step; likewise, a single element or step may be replaced with a plurality of elements or steps that serve the same purpose. Further, where parameters for various properties are specified herein for embodiments of the invention, those parameters can be adjusted up or down by $1/100$, $1/50$, $1/20$, $1/10$, $1/5$, $1/3$, $1/2$, $2/3$, $3/4$, $4/5$, $9/10$, $19/20$, $49/50$, $99/100$, etc. (or up by a factor of 1, 2, 3, 4, 5, 6, 8, 10, 20, 50, 100, etc.), or by rounded-off approximations thereof, unless otherwise specified. Moreover, while this invention has been shown and described with references to particular embodiments thereof, those skilled in the art will understand that various substitutions and alterations in form and details may be made therein without departing from the scope of the invention (for example, the condensed liquid can be a composition other than water; more or fewer stages can be used in the bubble-column condenser; and the configuration of those stages can be readily altered). Further still, other aspects, functions and advantages are also within the scope of the invention; and all embodiments of the invention need not necessarily achieve all of the advantages or possess all of the characteristics described above. Additionally, steps, elements and features discussed herein in connection with one embodiment can likewise be used in conjunction with other embodiments. The contents of references, including reference texts, journal articles, patents, patent applications, etc., cited throughout the text are hereby incorporated by reference in their entirety; and appropriate components, steps, and characterizations from these references optionally may or may not be included in embodiments of this invention. Still further, the components and steps identified in the Background section are integral to this disclosure and can be used in conjunction with or substituted for components and steps described elsewhere in the disclosure within the scope of the invention. In method claims, where stages are recited in a particular order—with or without sequenced prefacing characters added for ease of reference—the stages are not to be interpreted as being temporally limited to the order in which they are recited unless otherwise specified or implied by the terms and phrasing.

What is claimed is:

1. A humidification-dehumidification system comprising:
   a source of liquid including a vaporizable component;
   a humidifier including a carrier-gas inlet and a carrier-gas outlet; a liquid inlet and a liquid outlet, wherein the liquid inlet is coupled with the source of the liquid; and a chamber in which liquid introduced from the liquid inlet can contact a carrier gas containing a condensable fluid in vapor phase that is introduced from the carrier-gas inlet in a counterflow arrangement and in which a portion of the liquid can vaporize into the carrier gas;
   a bubble-column vapor mixture condenser including at least a first stage and a second stage, each stage including a carrier-gas inlet, a bubble generator in fluid communication with the carrier-gas inlet, a carrier-gas outlet and a chamber containing a liquid bath in fluid communication with the carrier-gas inlet and the carrier-gas outlet, wherein the liquid bath comprises the vaporizable component in liquid phase, wherein the carrier-gas inlet of the first stage is in fluid communication with the carrier-gas outlet of the humidifier, wherein the carrier-gas outlet of the first-stage is in fluid communication with the carrier gas inlet of the second stage to facilitate bubbling flow of the carrier gas from the humidifier through the liquid bath in the chamber of the first stage and then through the liquid bath in the chamber of the second stage, and wherein the bubble generator is configured to generate bubbles of the carrier gas in the liquid bath;
   a conduit passing from the source of the liquid through the chamber of each stage of the bubble-column condenser to recover energy from condensation; and
   an intermediate exchange conduit coupled with (a) the bubble-column vapor mixture condenser and (b) the humidifier chamber at intermediate stages of each for transfer of the carrier gas therebetween.

2. The humidification-dehumidification system of claim 1, wherein the liquid includes water.

3. The humidification-dehumidification system of claim 1, wherein the chambers containing the liquid baths have a height-to-diameter aspect ratio less than 1.

4. The humidification-dehumidification system of claim 1, further comprising surfaces extending from the conduit, wherein the surfaces are configured to increase the rate of heat transfer between the conduit and liquid in the chamber.

5. The humidification-dehumidification system of claim 1, wherein the bubble generator is selected from (a) a sieve plate and (b) a radial, ring, spider, and wheel-type sparger.

6. The humidification-dehumidification system of claim 1, wherein the bath in the first stage is at least 5° C. warmer than the bath in the second stage.

7. The humidification-dehumidification system of claim 1, wherein the carrier-gas outlet of the second stage is in fluid communication with the carrier-gas inlet of the humidifier.

8. A method for evaporating and condensing a fluid using the humidification-dehumidification system of claim 1, comprising:
   vaporizing a portion of a liquid in the humidifier into a carrier gas;
   condensing at least some of the vaporized portion from the carrier gas into the liquid baths in the first and second stages of the bubble-column vapor mixture condenser; and
   transferring the carrier gas between the bubble-column vapor mixture condenser and the humidifier through the intermediate exchange conduit.

* * * * *